United States Patent
Gladden et al.

(10) Patent No.: US 6,738,916 B1
(45) Date of Patent: May 18, 2004

(54) NETWORK CLOCK EMULATION IN A MULTIPLE CHANNEL ENVIRONMENT

(75) Inventors: Mark A. Gladden, Lewisville, TX (US); Neill R. Bell, Plano, TX (US); Kenneth A. Lauffenburger, Carrollton, TX (US)

(73) Assignee: Efficient Networks, Inc., Dallas, TX (US)

( * ) Notice: Subject to any disclaimer, the term of this patent is extended or adjusted under 35 U.S.C. 154(b) by 635 days.

(21) Appl. No.: 09/705,563

(22) Filed: Nov. 2, 2000

(51) Int. Cl.[7] ................................................. G06F 1/04
(52) U.S. Cl. .......................... 713/400; 713/600; 710/52
(58) Field of Search ................................. 713/400–600; 710/52, 57, 58, 61

(56) References Cited

U.S. PATENT DOCUMENTS

| | | | | |
|---|---|---|---|---|
| 5,623,483 | A | | 4/1997 | Agrawal et al. ............ 370/253 |
| 5,819,048 | A | * | 10/1998 | Okazaki et al. ............. 709/233 |
| 6,092,126 | A | * | 7/2000 | Rossum ....................... 710/52 |
| 6,279,058 | B1 | * | 8/2001 | Gulick ......................... 710/58 |
| 6,366,959 | B1 | * | 4/2002 | Sidhu et al. ................. 709/231 |
| 2002/0006137 | A1 | * | 1/2002 | Rabenko et al. ............ 370/466 |

OTHER PUBLICATIONS

Yong Xie, et al., "Adaptive Multimedia Synchronization in a Teleconference System," XP000625031, 0–7803–3250–4/96 IEEE, 5 pages, Publication Date: Jun. 23, 1996.

Warren A. Montgomery, "Techniques for Packet Voice Synchronization," IEEE Journal on Selected Areas in Communications, vol. SAC–1, No. 6, 7 pages, Dec. 1986.

PCT, Notification of Transmittal of the International Search Report or the Declaration, 7 pages, Jun. 28, 2002.

"B–ISDN ATM Adaptation Layer (AAL) Specification," ITU Recommendation 1.363, pp. 1–96, Mar. 1993.

"Circuit Emulation Service Interoperability Specification Version 2," ITU Recommendation 1.363, af–vtoa–0078.000. pp. 1–93, Jan. 1997.

"Voice and Telephone Over ATM to the Desktop Specification," The ATM Forum Technical Committee, af–vtoa–0083.000, pp. 1–38, May 1997.

* cited by examiner

*Primary Examiner*—Dennis M. Butler
(74) *Attorney, Agent, or Firm*—Baker Botts L.L.P.

(57) ABSTRACT

In one aspect of the invention, a method of emulating a network clock signal in a multiple channel environment includes receiving a plurality of asynchronous signals each associated with one of a plurality of communication channels and storing each of the plurality of asynchronous signals in one of a plurality of buffers, each associated with one of the communication channels, the buffers operable to communicate with a synchronous communication link having a frame rate. The method further comprises identifying one of the plurality of communication channels as a reference channel, determining a current depth of the buffer associated with the reference channel, and altering the frame rate of the synchronous communication link based at least in part on the current depth of the buffer associated with the reference channel.

45 Claims, 4 Drawing Sheets

NETWORK CLOCK EMULATION IN A MULTIPLE CHANNEL ENVIRONMENT

TECHNICAL FIELD OF THE INVENTION

The present invention relates to the field of communication systems, and more particularly to a system and method operable to facilitate network clock emulation in a multiple channel environment.

BACKGROUND OF THE INVENTION

To increase speed and efficiency of information transfer between two or more synchronous communication devices, it is often desirable to convert synchronous communication signals to an asynchronous format, and communicate the information using asynchronous communications links between the synchronous devices. Synchronous networks rely on one or more network clock signals to maintain the order and integrity of the information in the synchronous signals. When the synchronous signals are encoded into asynchronous datagrams, the reference timing information is typically lost. To ultimately deliver the information to synchronous network elements at the receiving end of the asynchronous network, it, therefore, becomes necessary to recreate, or emulate, at the receiving end the network clock signal so that the now asynchronous information can be reformatted into a synchronous form.

Emulating the network clock at customer premises equipment—such as modems, bridges, and routers coupled to interface devices like telephones and facsimile machines—can be very complex and expensive in systems supporting a plurality of communication channels serving a plurality of interface devices. Some systems have attempted to implement a separate reference clock for each communication channel served. This technique is expensive and complex.

SUMMARY OF THE INVENTION

The present invention recognizes a need for a method and apparatus operable to provide network clock emulation in a multiple channel communication system. In accordance with the present invention, a system and method for providing network clock emulation in a multiple channel environment are provided that substantially reduce or eliminate at least some of the shortcomings associated with prior approaches.

In one aspect of the invention, a method of emulating a network clock signal in a multiple channel environment comprises receiving a plurality of asynchronous signals each associated with one of a plurality of communication channels and storing each of the plurality of asynchronous signals in one of a plurality of buffers, each associated with one of the communication channels, the buffers operable to communicate with a synchronous communication link having a frame rate. The method further comprises identifying one of the plurality of communication channels as a reference channel, determining a current depth of the buffer associated with the reference channel, and altering the frame rate of the synchronous communication link based at least in part on the current depth of the buffer associated with the reference channel.

In another aspect of the present invention, a system for emulating a network clock signal in a multiple channel environment comprises a memory including a plurality of buffers each operable to receive one of a plurality of asynchronous signals. Each signal is operable to be associated with a separate communication channel, wherein at a given time one of the channels comprises a reference channel. The system further comprises a control module operable to communicate with at least some of the plurality of buffers and with a synchronous communication link. The synchronous communication link is operable to communicate the plurality of communication channels at a frame rate. The control module is operable to determine a current depth of the buffer associated with the reference channel and to adjust the frame rate of the synchronous communication link based at least in part on the current depth.

Depending on the specific features implemented, particular embodiments of the present invention may exhibit some, none, or all of the following technical advantages. One aspect of the present invention provides a mechanism for emulating a network clock signal for use with a plurality of communication channels, wherein the emulated network clock signal is generated using a single clock generation device. This aspect of the invention provides an advantage of synchronizing an emulated clock for multiple channels simultaneously, without the need for complex interaction between signal processors, or the use of separate emulated clocks for each channel. In addition, this configuration is easily scalable to any number of communication channels.

In another aspect of the invention, the frame rate of the bus communicating information for transmission across the asynchronous communication links is controlled based—at least in part—on the depth of a jitter buffer associated with a reference communication channel. Monitoring the frame rate of the synchronous communication link based on feedback relating to the jitter buffer depth provides an effective mechanism for ensuring that the emulated clock accurately tracks the network clock signal. In a particular embodiment, the invention compares a target depth to an average depth of a number of buffer depths to provide an advantage of smoother operation by minimizing the effect of outlying cell delay variations.

In still another aspect of the invention, a mechanism is provided that facilitates switching from a reference channel that is determined to be providing invalid feedback. By changing reference channels in response to detection of invalid feedback, the invention provides an advantage of avoiding erroneous alterations of the emulated clock signal, while maintaining advantages associated with using a reference channel to monitor and control multiple channels in system.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
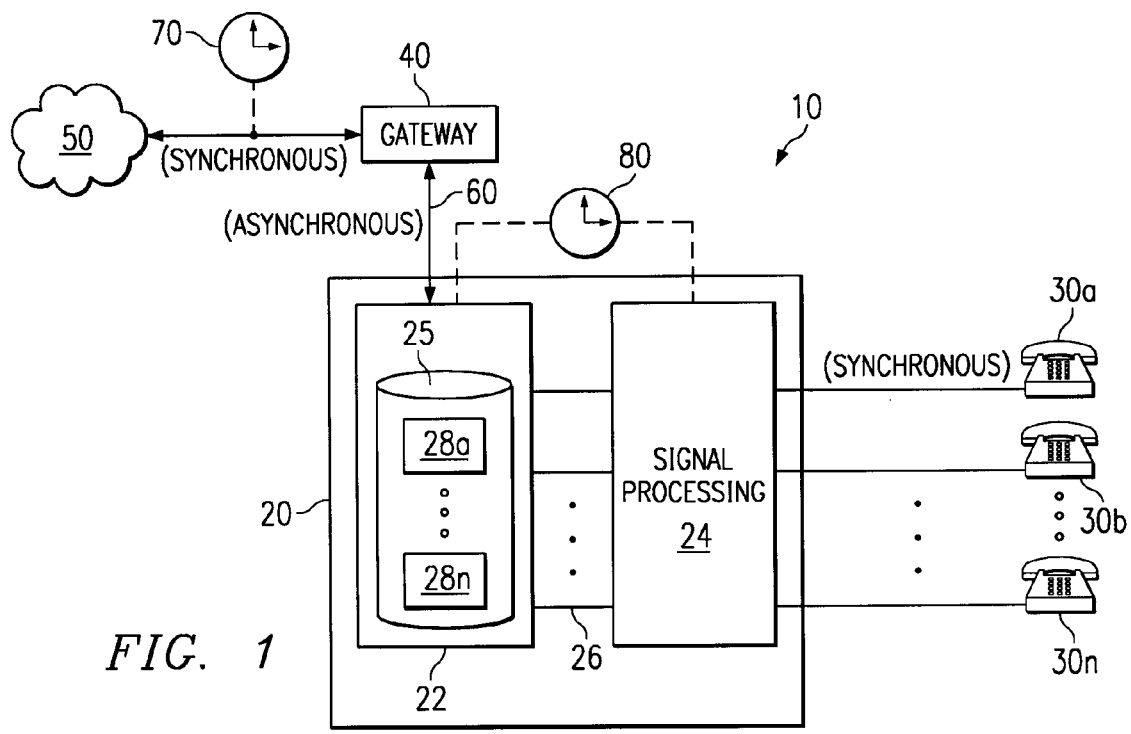
FIG. 1 is a block diagram of an exemplary embodiment of a system operable to facilitate network clock emulation for muultiple communication channels according to the teachings of the present invention.

FIG. 1 is a block diagram of an exemplary embodiment of a system 10 operable to facilitate emulation of a network clock in a multiple channel environment. System 10 includes a plurality of interface devices 30a–30n, which communicate with a synchronous network 50 through customer premises equipment (CPE) 20 and a gateway 40. In the illustrated embodiment, customer premises equipment 20 and gateway 40 facilitate asynchronous communication between synchronous network elements, such as interface devices 30a–30n and synchronous network 50.

Interface devices 30 comprise hardware, software, and/or firmware operable to allow users of customer premises equipment 20 access to system 10. Interface devices 30 may comprise, for example, telephones, facsimile machines, or any other type of computing and/or communication device operable to transmit and/or receive synchronous communication signals.

Network 50 may comprise a wireless network, a wireline network, an optical network, or a combination of these networks. For example, network 50 may comprise a public switched telephone network (PSTN), a local area network (LAN), a wide area network (WAN), or other communication systems or combination of communication systems at one or more locations. In addition, part of network 50 could comprise a data network, an integrated services digital network (ISDN), or a global computer network, such as the Internet.

Gateway 40 facilitates communication between customer premises equipment 20 and synchronous network 50. Gateway 40 may comprise, for example, one or more routers, bridges, switches, cross-connects, digital subscriber line multiplexers (DSLAM) or other computing and/or communication devices. In operation, gateway 40 receives synchronous signals, such as time division multiplexed (TDM) signals from synchronous network 50 and converts the synchronous signals to asynchronous signals, such as asynchronous transfer mode (ATM) cells, Frame Relay cells, or data packets—such as Transmission Control Protocol/Internet Protocol (TCP/IP) packets, for transmission across asynchronous communication link 60. Similarly, Gateway 40 receives asynchronous signals from asynchronous communication link 60 and converts those signals to synchronous signals for transmission over synchronous portions of network 50.

In the illustrated embodiment, asynchronous communication link 60 comprises a digital subscriber line. Asynchronous communication link 60 may, however, comprise any suitable wireless and/or wireline, electrical and/or optical based system that supports at least asynchronous communication between network elements using ground-based and/or space-based components. Signals communicated over communication link 60 may be encoded in, for example, cell based protocols such as ATM and Frame Relay, or packet based protocols, such as the Transmission Control Protocol/Internet Protocol (TCP/IP) or the User Datagram Protocol (UDP).

Customer premises equipment 20 receives asynchronous signals from asynchronous communication link 60 and converts those signals to synchronous signals for communication to interface devices 30. Likewise, customer premises equipment 20 also receives synchronous signals from interface devices 30 and converts those signals to asynchronous signals for communication over asynchronous communication link 60.

Customer premises equipment 20 may include various hardware, software, and/or firmware, or combinations thereof operable to manage communications to and from interface devices 30. In a particular embodiment, customer premises equipment 20 could also facilitate routing, bridging, and/or switching functionality between a one or more interface devices 30 and other external network elements.

In the illustrated embodiment, customer premises equipment 20 includes a controller 22 coupled to a signal processor 24 through a communication link 26. Controller 22 includes or otherwise has access to a memory 25. Memory 25 may comprise any storage medium or media and may include any of a variety of data structures, arrangements, and/or compilations operable to store and facilitate retrieval and/or execution of various information, instructions, and/or algorithms stored within memory 25. Although memory 25 is shown as residing within customer premises equipment 20, memory 25 could reside at any location accessible to controller 22.

Signal processor 24 includes hardware, software, and/or firmware operable to perform various signal processing operations. For example, where one or more of interface devices 30 comprise analog devices, signal processor 24 may include one or more coding/decoding (CODEC) modules operable to perform digital-to-analog conversions on signals communicated to interface devices 30 and analog-to-digital conversions on signals received from interface devices 30. Alternatively, or in addition, signal processor 24 could include one or more digital signal processors operable to perform functions such as echo cancellation and error detection. In other embodiments, some or all of the functionality of signal processing unit 24 could alternatively reside within controller 22.

In the illustrated embodiment, controller 22 and signal processor 24 communicate over a communication link 26. Communication link 26 may include a synchronous communication link, such as a TDM bus, or may comprise a combination of asynchronous and synchronous communication links. Synchronous portions of communication link 26 facilitate communication of multiple channels of information between controller 22 and interface devices 30. For example, various synchronous signals coming from network 50 may be associated with various different communication channels. Likewise, each interface device 30 may be associated with a separate communication channel and receive information from network 50 associated with that channel. Asynchronous signals received at customer premises equipment 20 and associated with a particular communication channel can be communicated to interface devices 30 associated with that channel by, for example, clocking those signals into a time slot of a TDM bus that is reserved for that channel. Information associated with a particular channel can be communicated in that channel's time slot or time slots within each TDM frame.

To facilitate clocking the asynchronous signals onto the synchronous portion of communication link 26, customer premises equipment 20 emulates a reference clock 70 used in network 50 to generate and/or communicate the original synchronous signals. Controller 22, therefore, generates an emulated clock signal 80 and uses this signal to clock asynchronous signals onto the synchronous portion of communication link 26. Numerous problems can arise, however, when emulating a network clock 70.

For example, if the emulated clock 80 runs faster than the network clock 70, controller 22 will place information onto the synchronous portion of communication link 26 at a faster rate than it is receiving the information. Consequently, controller 22 will eventually run out of data and communicate empty time slots until it receives additional information for that channel. If, on the other hand, the emulated clock 80 runs slower than the network clock 70, the controller will not be loading the synchronous portion of communication link 26 as quickly as it is receiving information, and some information can be lost due to buffer congestion. In addition, variations in delay of transmitting asynchronous signals over communication link 60 can result in asynchronous signals not being available for transmission when the synchronous communication link becomes ready to accept the signals. This cell delay variation can cause significant errors in the regenerated synchronous signal.

To help alleviate the cell delay variation problem and to partially account for non-uniform speeds between network clock 70 and emulated clock 80, the invention implements one or more jitter buffers in memory 25 to temporarily store the asynchronous signals received from communication link 60 until they are ready to be loaded onto the synchronous portion of communication link 26. In a particular embodiment, memory 25 includes a plurality of jitter buffers 28a–28n, each operable to store asynchronous signals associated with a particular communication channel until those signals can be clocked onto the synchronous communication link.

Storing a plurality of asynchronous samples in jitter buffers 28 creates a reservoir of samples ready for transmission over the synchronous portion of communication link 26, and ensures that controller 22 will have access to the next asynchronous sample, despite any delays that occur in between transmission of asynchronous samples from gateway 40 and despite variations in those delays. As customer premises equipment 20 receives asynchronous signals from communication link 60, it temporarily stores those signals in memory 25 until they can be clocked onto the synchronous communication link in the time slot associated with that channel. The reservoir of asynchronous samples helps account for variations in delay of the transmission of the samples over communication link 60.

While the use of jitter buffers helps alleviate problems associated with cell delay variations, it does not adequately address the problem of variations between speeds of network clock 70 and emulated clock 80. For example, if emulated clock 80 consistently runs faster than network clock signal 70, controller 22 will eventually starve jitter buffer 28, causing transmission of empty channels on the synchronous portion of communication link 26. If emulated clock 80 consistently runs slower than network clock signal 70, jitter buffer 28 will eventually overflow, causing loss of subsequently received asynchronous signals.

System 10 addresses this difficulty by implementing a feedback mechanism to control emulated clock 80 and, therefore, control timing of all communication channels transmitted over the synchronous portion of communication link 26. In particular, system 10 tracks the depth of one reference jitter buffer 28 stored in memory 25, and compares that depth to a target buffer depth. Using as feedback the difference between the target depth and the actual depth of the reference, system 10 can alter the speed of emulated clock 80 to more closely match that of network clock 70.

By using the depth of a reference buffer to control multiple channels within system 10, the invention facilitates cost effective and efficient clock emulation in a multiple channel environment. For example, the operation and configuration of system 10 provides an advantage of synchronizing emulated clock 80 for multiple communication channels, without the need for complex interaction between signal processors, or the use of separate emulated clocks for each channel.

Figure 2:
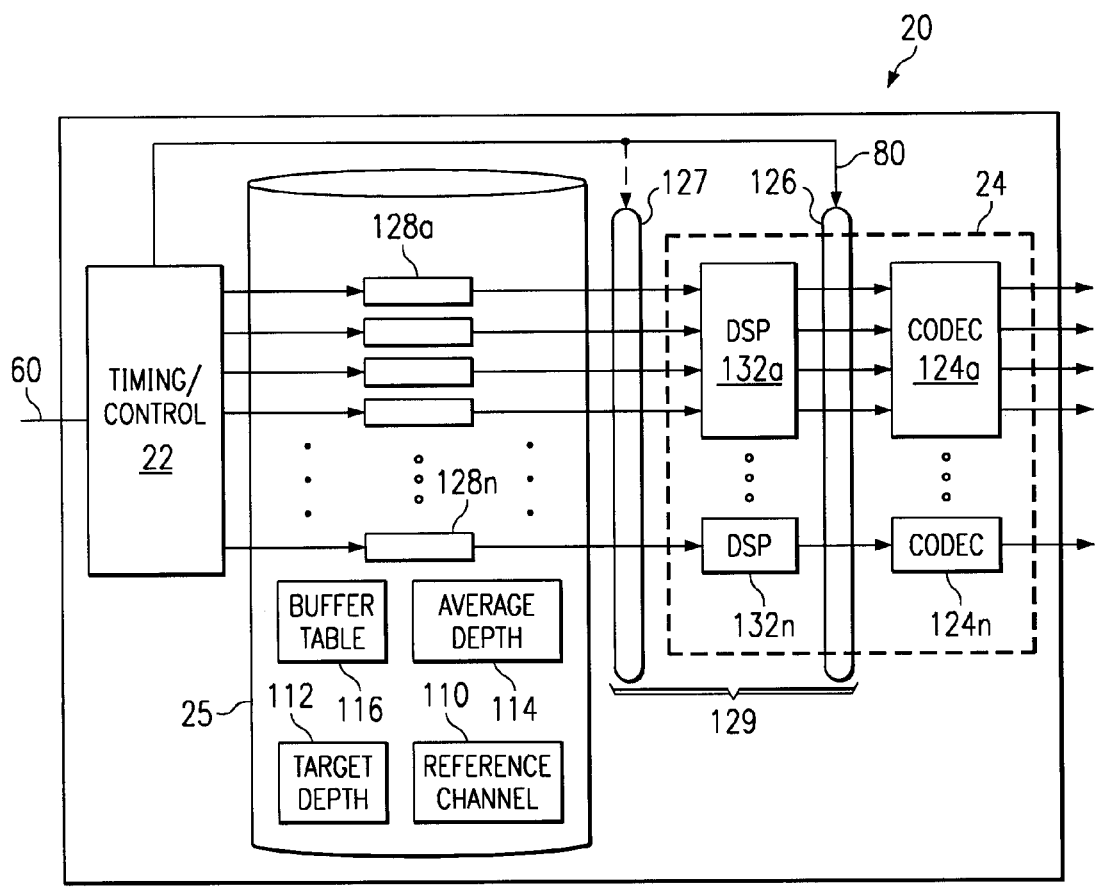
FIG. 2 is a block diagram of one embodiment of customer premises equipment operable to facilitate network clock emulation for multiple communication channels according to the teachings of the present invention.

FIG. 2 is a block diagram of one embodiment of customer premises equipment 20 operable to facilitate network clock emulation in a system supporting multiple communication channels. FIG. 2 shows one possible arrangement of components of customer premises equipment 20, including controller 22, memory 25, and signal processor 24. Other arrangements and configurations could be used without departing from the scope of the invention.

As discussed above, controller 22 receives asynchronous signals from communication link 60 and temporarily stores those signals in memory 25. In this particular embodiment, memory 25 includes a plurality of jitter buffers 128a–128n. Jitter buffers 128 may each comprise a separate memory structure, or may comprise logical partitions within one or more common memory structures. Each of jitter buffers 128 stores asynchronous samples associated with one of the plurality of communication channels. In a particular embodiment, customer premises equipment 20 supports twenty-four communication channels. In that particular embodiment, customer premises equipment 20 may implement twenty-four jitter buffers, one for each communication channel. System 10 may support any number of communication channels and associated jitter buffers consistent with the present invention.

In the illustrated embodiment, signal processor 24 includes a plurality of coding/decoding modules (CODEC) 124a–124n. Each CODEC 124 receives digital samples of analog signals associated with communication channels of system 10. In cases where interface devices 30 comprise analog devices, CODECs 124 convert the digital samples into analog signals for transmission to interface devices 30.

In the particular embodiment discussed above where customer premises equipment 20 implements twenty-four communication channels, signal processor 24 may include, for example, six CODEC modules 124, each operable to process four channels of information. Other numbers of channels and configurations of equipment could be used without departing from the scope of the invention.

In the illustrated embodiment, signal processor 24 also includes a plurality of digital signal processors 132a–132n. Digital signal processors 132 facilitate signal processing functions, such as, echo cancellation and error detection. Although the present embodiment shows a plurality of digital signal processors, a single digital signal processor could alternatively be used without departing from the scope of the invention. In addition, although the embodiment shown in FIG. 2 depicts digital signal processors 132 as residing in signal processor 24, digital signal processors 132 could alternatively reside within controller 22 or at another location within customer premises equipment 20.

In this example, signal processor 24 communicates with jitter buffers 128 in memory 25 over a communication link 127. In one embodiment, communication link 127 comprises a synchronous communication link, such as a time division multiplexing (TDM) bus. Alternatively, communication link 127 could comprise an asynchronous communication link operable to communicate ATM, Frame Relay, TCP/IP, or other cell or packet based information.

In the embodiment shown in FIG. 2, digital signal processors 132 communicate with CODEC modules 124 through a synchronous communication link 126. Synchronous communication link 126 may comprise, for example, a TDM bus. In a particular embodiment, each DSP 132/CODEC module 124 pair could communicate through a separate TDM bus, each bus driven by emulated clock signal 80. Likewise, each digital signal processor 132 could communicate with its associated jitter buffers 128 through separate TDM buses. In that case, each TDM bus could be driven by a common emulated clock signal 80.

Regardless of where the transformation occurs, at some point before signals are communicated to interface devices 30, the signals are converted from an asynchronous format to a synchronous format. For simplicity, the following description refers to communication links 126 and 127 collectively as "synchronous communication link 129." Although this description assumes that communication link 127 comprises a synchronous link, it should be noted that portion 127 of communication link 129 could alternatively comprise an asynchronous link. In that case, the following discussion's reference to synchronous communication link 129 would refer to synchronous communication link 126 only.

Synchronous communication link 129 is driven by an emulated clock signal 80. Emulated clock signal 80 establishes frames on synchronous communication link 129, wherein each frame comprises a plurality of time slots, each time slot associated with one of the plurality of communication channels. Asynchronous signals for each channel stored in jitter buffers 128 are clocked into associated time slots of synchronous communication link 129 and ultimately communicated to interface devices 30.

In operation, controller 22 receives asynchronous signals from communication link 60 and determines a communication channel associated with each of the asynchronous signals received. Controller 22 stores each asynchronous signal in a jitter buffer 128 associated with the communication channel identified with that signal. In the illustrated embodiment, one of the communication channels is used as a reference channel to provide feedback to controller 22, allowing controller 22 to modify emulated clock signal 80 to more closely approximate network clock signal 70. Memory 25 includes a reference channel storage 110, which identifies the communication channel currently being used as a feedback reference channel.

For each signal received, controller 22 determines the communication channel associated with that signal, stores the signals in its associated jitter buffer 128, and determines whether the associated communication channel is the current feedback reference channel 110. If the current channel is the feedback reference channel 110, controller 22 determines the depth of the associated jitter buffer 128 and compares that depth to a target depth 112 stored in memory 25. For example, controller 22 may determine the number of bytes currently stored in the associated jitter buffer 128 and compare that result to a number of bytes identified as a target depth, an indication of which is stored in target depth storage 112.

Depending on the result of that comparison, controller 22 adjusts emulated clock signal 80 to more closely approximate network clock signal 70. For example, if the depth of jitter buffer 128 is greater than target depth 112, system 10 recognizes that emulated clock signal 80 is running at a slower rate than network clock signal 70, resulting in jitter buffer 128 having a larger than desired depth. In that case, controller 22 increases the rate of emulated clock signal 80 accordingly. On the other hand, if the depth of jitter buffer 128 is smaller than target depth 112, controller 22 recognizes that emulated clock signal 80 is faster than network clock signal 70, resulting in jitter buffer 128 depleting at a faster rate than it is being filled. In that case, controlled 22 decreases the speed of emulated clock signal 80 to more closely approximate network clock signal 70.

In a particular embodiment, controller 22 may compare target depth 112 to an average depth 114 of jitter buffer 128 associated with the current reference channel. In that case, memory 25 may include a buffer history table 116, which stores buffer depths of jitter buffer 128 associated with the reference channel after each of a plurality of previous signal storing events. Comparing target depth 112 to an average depth 114 of a number of previous buffer depths provides an advantage of smoother operation by minimizing the effect of outlying cell delay variations.

Using a single emulated clock signal controlled by monitoring a reference channel, customer premises equipment 20 provides a significant advantage in facilitating emulation of a network clock signal for a plurality of communication channels. This system allows the use of a single clock generation mechanism to drive all communication channels, which significantly reduces costs and complexity of the system. In addition, this configuration is easily scalable to any number of communication channels.

FIGS. 3a–3d are block diagrams of one embodiment of memory structures 110, 114, and 116 of memory 25. Memory structure 116 is a buffer depth history operable to store a plurality of buffer depths associated with a particular communication channel that has been designated as a reference channel. Buffer depth history may comprise any data structure, compilation, or other arrangement of information. In this example, buffer depth history 116 comprises a table having a plurality of entries 140–148, each entry corresponding to the depth of the reference buffer at one point in time. As a particular example, buffer depth history 116 table comprises fifty entries. Buffer depth history 116 may, however, comprise any number of entries. In the illustrated embodiment, buffer depth history table 116 uses a pointer 118 to identify the most recently stored buffer depth information.

Figures 3A, 3B, 3C:
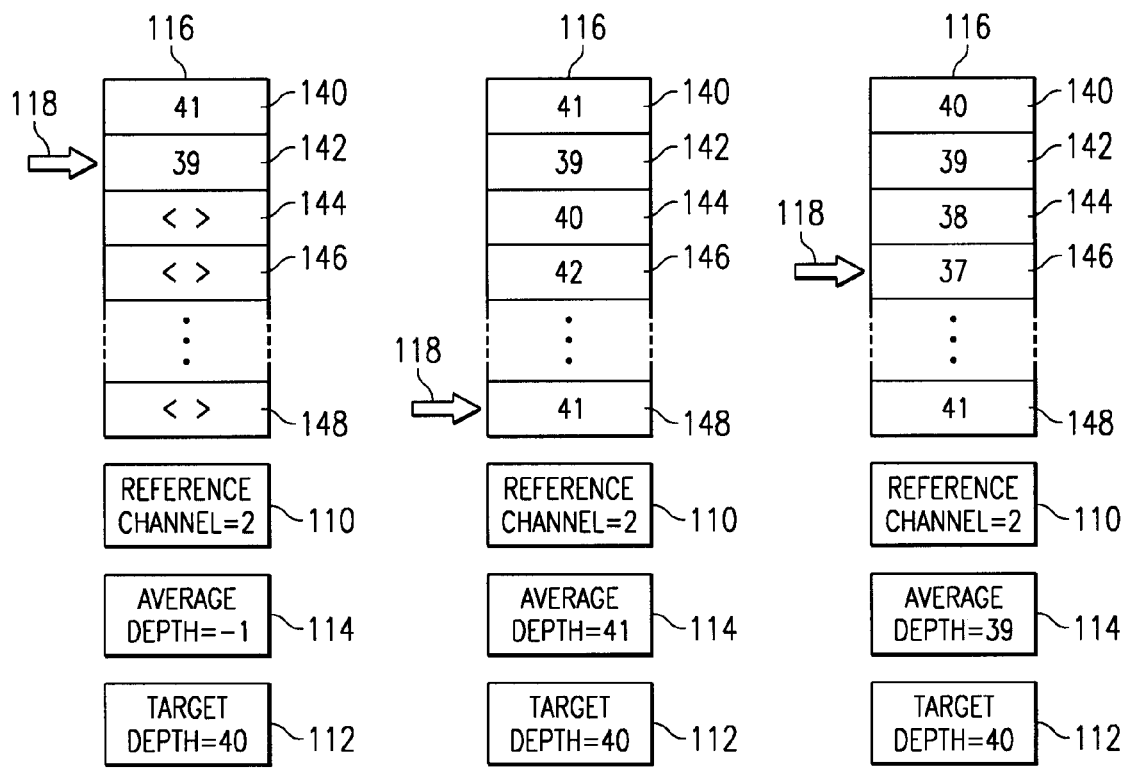
FIGS. 3a–3d are block diagrams of one embodiment of memory structures constructed according to the teachings of the present invention.

Each time a new reference channel is established, system 10 clears the contents of buffer depth history table 116. Each time system 10 receives another asynchronous signal associated with reference channel 112, controller 22 stores that signal in the associated jitter buffer 128, and stores the depth of that jitter buffer 128 in buffer depth history table 116. If there are open entries in buffer depth history table 116, such as shown in FIG. 3a, controller 22 stores the current depth in the first empty entry 144. Once all entries are full, controller 22 replaces the oldest buffer depth information with the current buffer depth information, as shown in FIG. 3c.

System 10 uses buffer depth history 116 to calculate an average buffer depth 114, which can then be compared to a target buffer depth 112 to determine an error between the emulated clock signal 80 and the network clock signal 70. In this embodiment, the value of the average depth of the reference jitter buffer remains at −1 until the entire table 116 is filled. FIG. 3b illustrates a situation where buffer history table 116 is completely full, pointer 118 indicating that entry 148 was most recently filled. In this case, controller 22 uses the values stored in table 116 to calculate an average depth of the associated jitter buffer during the previous fifty buffer writes.

In the example shown in FIG. 3b, average depth 114 is calculated as forty-one bytes. Controller 22 compares average depth 114 to target depth 112 and determines, in this case, that the depth of jitter buffer 128 exceeds the target depth. This indicates that emulated clock signal 80 is running too slow. Controller 22 uses this information to increase the rate of emulated clock signal 80.

FIG. 3c shows an example of buffer history table 116 after emulated clock signal 80 has been adjusted in light of an oversized buffer depth 114. In the example shown in FIG. 3c, values 140–146 have been replaced with more recent buffer depth values. In this case, when controller 22 executes its control algorithm, it determines that the average depth 114 of the jitter buffer associated with the reference channel has become smaller than target depth 112. In that case, controller 22 decreases the speed of emulated clock signal 80 to allow the depth of jitter buffer 128 to grow to target depth 112.

Under various circumstances, system 10 may determine that a channel being used as the reference channel is providing or will provide invalid feedback, which is causing or may cause controller 22 to erroneously adjust the speed of emulated clock signal 80. In those situations, it is desirable to change reference channels in order to avoid the invalid feedback. For example, the current reference channel may stop receiving information because the associated interface device 30 is no longer in use. In that case, the depth of jitter buffer 128 associated with that channel will naturally deplete, but not because emulated clock signal 80 is set inappropriately.

As another example, customer premises equipment 20 may experience a period of far-end silence suppression which results in a loss of information for transmission to interface device 30. In that case, where the far-end silence suppression is localized to a particular channel or channels, it is inappropriate to adjust emulated clock signal 80 for all other channels not experiencing that condition.

As still another example, controller 22 may detect missing data in signals associated with particular channels, but not others. In that case, if the missing data is associated with the reference channel, it may be inappropriate to use that channel as a reference channel for all other channels.

In yet another example, the channel being used as a reference may experience a change of encoding or compression used on that channel. As a result, digital signal processors 132 may experience a period of delay in adjusting to the new encoding scheme, which results in variations in the depth of the associated jitter buffers 128. These changes are typically unrelated to differences between emulated clock signal 80 and network clock signal 70. System 10 facilitates switching reference channels upon any of these occurrences.

Figure 3D:
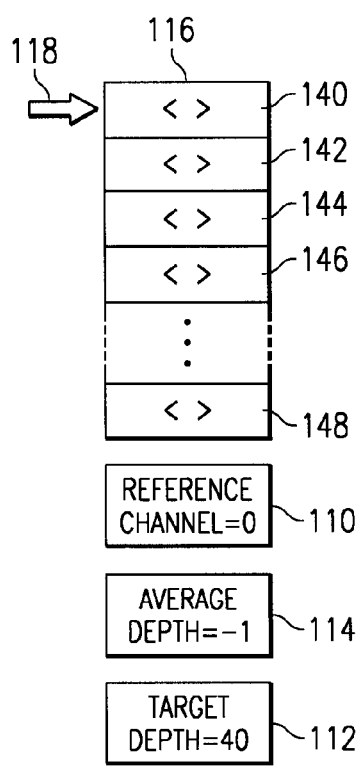

FIG. 3d shows the contents of buffer depth history table 116 after controller 22 detects invalid feedback information, such as that previously discussed. When controller 22 detects invalid feedback information, it clears the contents of buffer history table 116 and sets average depth 114 to −1. Controller 22 can then identify a new reference channel and continue to populate buffer history table 116 with information relating to the new reference channel.

Where controller 22 identifies a type of invalid feedback, which is likely to continue for a particular time period, controller 22 may suspend the associated channel from acting as a reference channel for approximately that time period. For example, where controller 22 receives an asynchronous signal that triggers an encoding change on that communication channel, controller 22 may temporarily suspend that channel from acting as the reference channel. As a particular example, it may be estimated that the encoding change will cause a perturbation in the associated jitter buffer's depth that will stabilize within three seconds. Controller 22 may suspend that channel from acting as the reference channel, and set a timer associated with that channel that will expire after the estimated settling time for the buffer. After the timer expires, the channel can again be eligible to serve as the reference channel.

Figure 4:
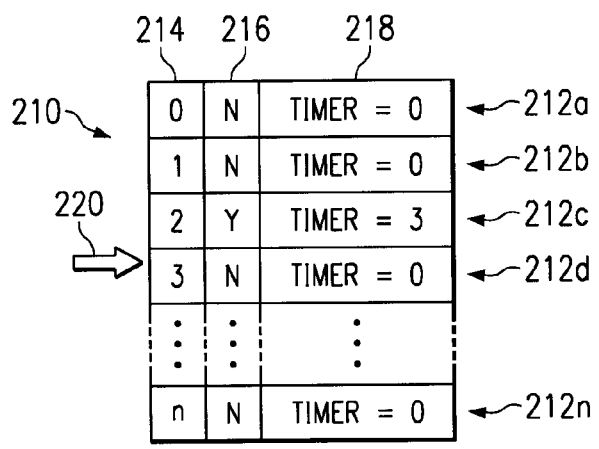
FIG. 4 is a block diagram of one embodiment of a channel status storage constructed according to the teachings of the present invention.

FIG. 4 is a block diagram of one embodiment of a channel status storage 210 useful in selecting and monitoring reference channels. Channel status storage 210 may comprise any data structure, compilation, or other arrangement of information. In this example, channel status storage 210 comprises a table having a plurality of entries 212a–212n, each entry corresponding to a communication channel serviced by system 10. In this particular example, each entry 212 includes information identifying the channel number 214, a flag indicating whether each channel has been suspended 216, and a timer value 218 indicating a time period for which the associated channel remains in suspension.

Each time system 10 receives an asynchronous signal from communication link 60, controller 22 determines whether a reference channel has been set. Controller 22 can make this determination, for example, by examining reference channel identifier 112 (FIGS. 3a–3d). In a particular example, reference channel identifier 112 holds the channel number of the reference channel whenever there exists a reference channel. Where no reference channel exists—for example, because controller 22 discovered invalid feedback associated with the previous reference channel—reference channel identifier 112 may contain a zero, indicating that no reference channel currently exists. Another way to determine whether a reference channel has been set is to use a pointer 220. Pointer 220 could point to the entry corresponding to the current reference channel, or could point to a "zero" entry to indicate that no current reference channel has been set. System 10 may implement channel status storage 210 to identify and select a valid reference channel, and to track invalid reference channels and their progress toward validity.

Figure 5A:
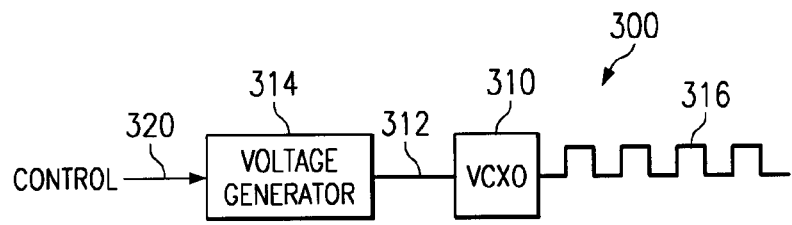
FIGS. 5a–5b are block diagrams showing various embodiments of control circuitry operable to control the speed of an emulated clock signal according to the teachings of the present invention.
Figure 5B:
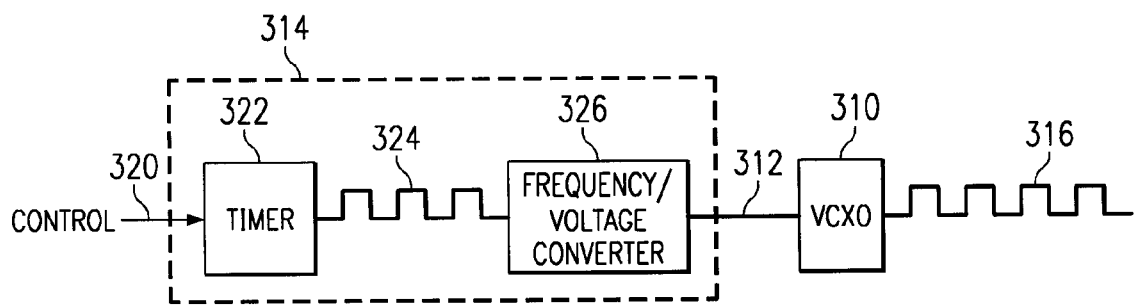

FIGS. 5a–5b are block diagrams showing various embodiments of control circuitry 300 operable to control the speed of emulated clock signal 80. Control circuitry 300 includes a voltage-controlled oscillator (VCXO) 310 which receives an input voltage signal 312 from a voltage generator 314. Voltage-controlled oscillator 310 generates a clock signal 316 having a frequency that varies depending on voltage signal 312. Clock signal 316, or a derivative version thereof, can be used as emulated clock signal 80 to drive synchronous communication link 129 (FIG. 2).

In the embodiment shown in FIG. 5a, voltage generator 314 receives a control signal 320. Control signal 320 modifies input voltage 312, which in turn alters the frequency of clock signal 316. Controls signal 320 may comprise, for example, a signal derived from the difference between target depth 112 and average depth 114 of jitter buffer 128 associated with the current reference channel. Where the average buffer depth is larger than the target buffer depth 112, control signal 320 may increase the frequency of voltage-controlled oscillator 310, effectively increasing the frame rate of synchronous communication link 129. Where, on the other hand, the average buffer depth is smaller than target buffer depth 112, control signal 320 may decrease the frequency of voltage-controlled oscillator 310, effectively decreasing the frame rate of synchronous communication link 129.

The configuration shown in FIG. 5a provides one possible mechanism for controlling the frame rate of synchronous communication link 129—in this example, by controlling the clocking speed of synchronous communication link 129, which can be derived from emulated clock signal 80. FIG. 5b shows additional details of a particular example of a voltage generator 314. In this particular example, voltage generator 314 includes a timer 322 operable to output timing signal 324 to a frequency to voltage converter 326. In this example, timer 322 receives control signal 320. Control signal 320 alters the frequency of clock signal 324, which in turn alters voltage signal 312 emitted from frequency-to-voltage converter 326.

In an alternative embodiment, voltage generator 314 may comprise an analog to digital converter receiving digital control signals 320. The digital-to-analog converter produces an analog control signal that is fed into voltage-controlled oscillator 310 to control the frequency of the output signal 316.

Figure 6:
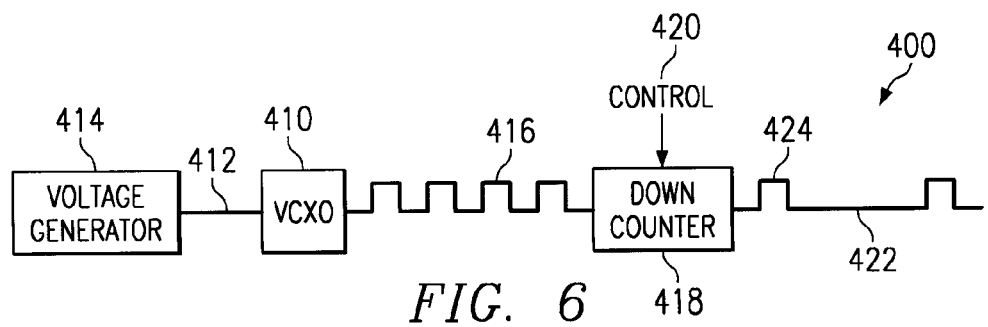
FIG. 6 is a block diagram showing still another embodiment of a control circuitry operable to control the speed of an emulated clock signal according to the teachings of the present invention.

FIG. 6 is a block diagram showing still another embodiment of control circuitry 400 operable to control the speed of emulated clock signal 80. Control circuitry 400 includes a voltage-controlled oscillator (VCXO) 410 which receives an input voltage signal 412 from a voltage generator 414. Voltage-controlled oscillator 410 generates a clock signal 416 having a frequency that varies depending on voltage signal 412. In this example, a down counter 418 receives clock signal 416 having a frequency (f), and outputs clock signal 422, having a frequency equal to the desired frame rate of synchronous communication link 129. Clock signal 416, or a derivative thereof, may serve as an emulated clock signal in system 10.

synchronous communication link 129 uses the frame synch signals 424 to identify the beginning of a new set of time slots associated with a new frame. In the illustrated embodiment, down counter 418 receives a control signal 420, comprising a frame synch override signal. Frame synch override signal 420 operates to insert a frame synch signal into signal 422, causing synchronous communication link 129 to start loading information into a new frame. By controlling the timing of frame synch signals 424, control circuitry 400 can control the size of the frames and, therefore, the frame rate of synchronous communication link 129.

Control signal 420 may be derived from, for example, the difference between target buffer depth 112 and an average buffer depth of the buffer 128 associated with the reference clock. Where the average buffer depth is smaller than the target buffer depth 112, control signal 420 may signal a frame synchronization resulting in a slightly larger frame size, effectively slowing the frame rate of synchronous communication link 129. Where, on the other hand, the average buffer depth is larger than target buffer depth 112, control signal 420 may signal a frame synchronization resulting in a slightly smaller frame size, effectively increasing the frame rate of synchronous communication link 129.

Figure 7:
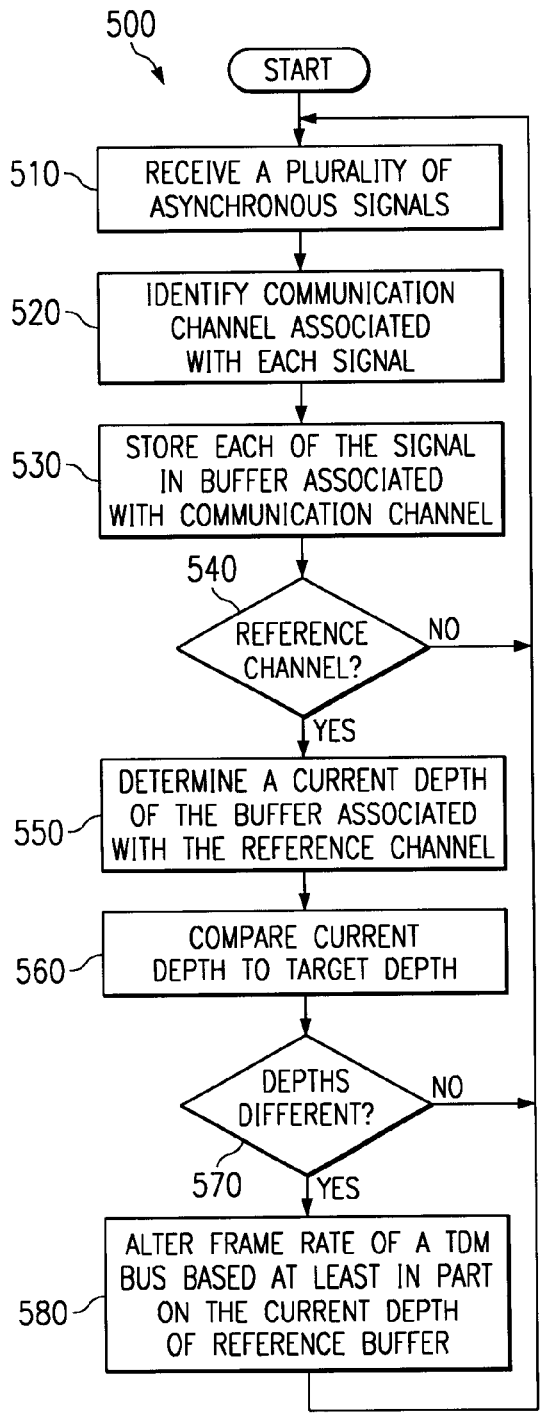
FIG. 7 is a flowchart showing one example of a method of recovering a clock signal in a multiple channel communication system according to the teachings of the present invention.

FIG. 7 is a flowchart showing one example of a method 500 of emulating a network clock signal in a multiple channel communication system. Method 500 begins at step 510 where system 10 receives a plurality of asynchronous signals from asynchronous communication link 60. Each one of the asynchronous signals is associated with a communication channel supported by system 10. Controller 22 identifies at step 520 the communication channel associated with each asynchronous signal received. Controller 22 then stores each signal in a jitter buffer 128 associated with the communication channel carrying the particular asynchronous signal at step 530. Jitter buffers 128 may comprise separate memory structures, or may comprise logical partitions within one or more common memory structures. For each signal received, controller 22 determines at step 540 whether the signal is associated with a communication channel that has been designated as a reference channel for system 10. Where controller 22 identifies a signal associated with the current reference channel, controller 22 determines at step 550 a current depth associated with jitter buffer 128 associated with the current reference channel. Determining the current depth of jitter buffer 128 may include consulting buffer depth history table 116 and determining an average depth 114 of jitter buffer 128 over a number (n) of previous buffer entries. Averaging multiple buffer depths provides an advantage of minimizing outlying buffer depth variations resulting in smoother system operation.

Controller 22 compares the current depth of jitter buffer 128 to target buffer depth 112 at step 560. If the depths differ at step 570, controller 22 alters the frame rate of synchronous communication link 129 based at least in part on the current depth of reference buffer 128 at step 580. Altering the frame rate of synchronous communication link 129 may include, for example, formulating a control signal operable to manipulate the input voltage to a voltage-controlled oscillator, thereby varying the frame rate of the output signal from the oscillator. Alternatively, altering the frame rate of synchronous communication link 129 may comprise formulating a control signal 420 operable to manipulate introduction of a frame-synch signal, thereby modifying the size of the frames—and therefore the frame rate—of synchronous communication link 129.

Figure 8:
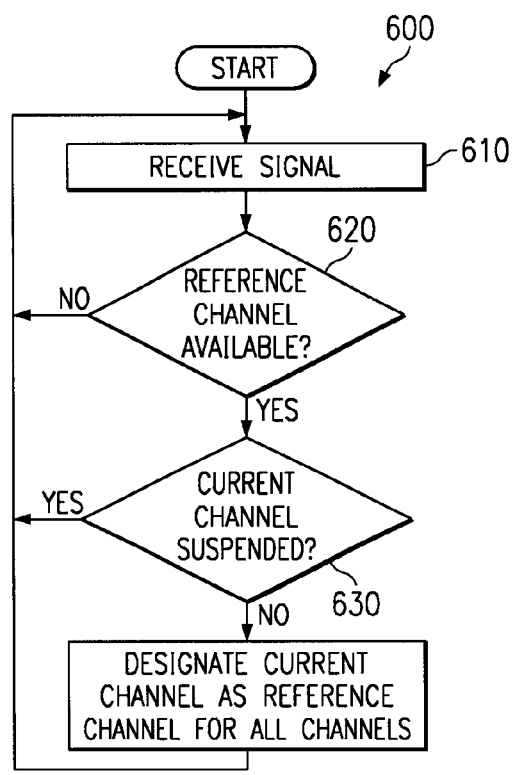
FIG. 8 is a flowchart showing one example of a method of designating a reference channel for monitoring emulation of a network clock according to the teachings of the present invention.

FIG. 8 is a flowchart showing one example of a method 600 of designating a reference channel for monitoring emulation of a network clock. Method 600 begins at step 610 where controller 22 receives an asynchronous signal from asynchronous communication link 60 and determines the communication channel associated with that signal. Controller 22 determines at step 620 whether a reference channel is currently designated in system 10. Determining whether a reference channel has been designated may include, for example, accessing reference channel storage 110 and examining the contents thereof. For example, if reference channel storage 110 includes a valid channel number for system 10, controller 22 determines that a reference channel has already been set in system 10. Where no reference channel is currently set in system 10, reference channel storage 110 may store a value of, for example, channel zero, or other information indicating that no channel has been currently set.

Where controller 22 determines that no channel is currently designated as a reference channel for system 10, controller 22 determines at step 630 whether the channel associated with the signal being evaluated has been suspended. A channel may be suspended, for example, because invalid feedback has been detected with respect to that channel. If the channel is found to have been suspended at step 630, that channel is not eligible at this time to be designated the reference channel for system 10. If controller 22 may determine whether a particular channel is suspended by, for example, consulting channel status storage 210 and examining status field 216 associated with that channel.

If controller 22 determines at step 630 that the channel is not suspended, controller 22 designates that channel as a reference channel for some or all channels in system 10. Implementing a reference channel to monitor and control a single reference clock for multiple communication channels of system 10 provides significant cost and efficiency advantages.

Figure 9:
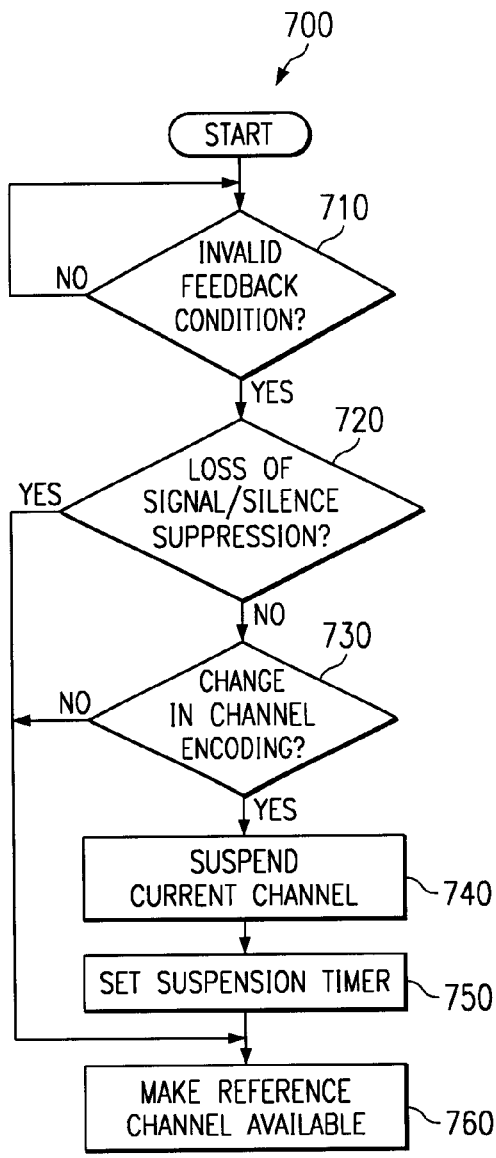
FIG. 9 is a flowchart showing one example of a method of changing reference channels upon detection of invalid feedback according to the teachings of the present invention.

FIG. 9 is a flowchart showing one example of a method 700 of changing reference channels upon detection of invalid feedback. Method 700 begins at step 710 where system 10 detects an invalid feedback condition. An invalid feedback condition may be any condition in which it would be advantageous to designate a different communication channel as the reference communication channel. For example, an invalid feedback condition may include a reduction or loss of signals received at customer premise equipment 20 associated with particular communication channels, loss of data due to far-end silence suppression, or changes in the end coding associated with the current channel.

Controller 22 determines at step 720 whether the invalid feedback condition detected at step 710 comprises a loss of signal due to interface device 30 becoming inactive or as a result of far-end signal suppression. If one of those conditions is encountered, controller 22 releases the current channel from its designation as reference channel, and makes the reference channel designation available to another communication channel at step 760.

If controller 22 determines at step 30 the invalid feedback condition detected at step 710 comprises a change in channel encoding, controller 22 suspends the current channel at step 740, sets a suspension timer at step 750, and releases the current channel from its designation as reference channel at step 760. Controller 740 sets the suspension timer to approximate the time period it will take for changes in the buffer depth due to encoding changes to stabilize. After that time period, the channel experiencing the change in encoding may be again eligible to be designated as a reference channel for system 10.

By changing reference channels upon detection of invalid feedback, system 10 provides an advantage of avoiding erroneous alterations of emulated clock signal 80, while maintaining advantages associated with using a reference channel to monitor and adjust synchronous communication link 129 communicating multiple channels in system 10.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of emulating a network clock signal in a multiple channel environment, comprising:

receiving a plurality of asynchronous signals, wherein at least some of the plurality of asynchronous signals are associated with different ones of a plurality of communication channels;

storing information from each of the plurality of asynchronous signals in an associated one of a plurality of buffers, each buffer associated with one of the communication channels, the buffers operable to store the information pending its transmission over a synchronous communication like having a frame rate;

identifying one of the plurality of communication channels as a reference channel;

determining a current depth of the buffer associated with the reference channel; and altering the frame rate of the synchronous communication link based at least in part on the current depth of the buffer associated with the reference channel, wherein the synchronous communication like carries at least the information associated with the reference channel and the information associated with another one of the plurality of communication channels.

2. The method of claim 1, wherein the asynchronous signal comprises at least one sample of an analog voice signal.

3. The method of claim 1, wherein the asynchronous signal comprises an asynchronous transfer mode (ATM) signal or a Frame Relay signal.

4. The method of claim 1, wherein each of the plurality of buffers comprises a logical partition within a single memory structure.

5. The method of claim 1, wherein each of the plurality of buffers comprises a separate memory structure.

6. The method of claim 1, wherein the synchronous communication link comprises a time division multiplexing bus.

7. The method of claim 1, wherein the buffers are coupled to the synchronous communication link by an asynchronous communication link.

8. The method of claim 1, wherein identifying a reference channel comprises:

for each asynchronous signal received, determining whether a valid reference channel exists; and if no valid reference channel exists, determining whether the communication channel associated with the current asynchronous signal is suspended; and if the current channel is not suspended, identifying the current channel as the reference channel.

9. The method of claim 1, wherein altering the frame rate of the synchronous communication link comprises:

comparing the current depth of the reference buffer to a reference depth;

increasing the frame rate of the synchronous communication link if the current depth is greater than the reference depth; and decreasing the frame rate of the synchronous communication link if the current depth is less than the reference depth.

10. The method of claim 9, wherein comparing the current depth to a reference depth comprises:

storing the current depth in a memory containing a plurality of previously measured reference buffer depths;

calculating an average depth of the reference buffer over the current depth and the plurality of previously measured depths; and comparing the average depth to the reference depth.

11. The method of claim 1, wherein altering the frame rate of the synchronous communication link comprises altering an input voltage to a voltage controlled oscillator driving the synchronous communication link.

12. The method of claim 1, wherein altering the frame rate of the synchronous communication link comprises altering size of the frames communicated across the synchronous communication link.

13. The method of claim 1, further comprising changing the designation of the reference channel in response to identifying an invalid feedback condition.

14. The method of claim 13 wherein identifying the invalid feedback condition comprises identifying a reduction or loss of the asynchronous signal.

15. The method of claim 14, wherein the reduction or loss of the asynchronous signal comprises a condition selected from the group consisting of a closing of a voice port, loss of signal due to far-end silence suppression, and detection of missing data in the asynchronous signal.

16. The method of claim 13 wherein identifying the invalid feedback condition comprises:

identifies an encoding change between a current asynchronous signal and a previously received asynchronous signal associated with the same communication channel as the current asynchronous signal; and suspending the associated channel from serving as a reference channel for a suspension period.

17. A system for emulating a network clock signal in a multiple channel environment, comprising:

a memory comprising a plurality of buffers each buffer operable to store information from one of a plurality of asynchronous signals, wherein at least some of the plurality of asynchronous signals are associated with different ones of a plurality of communication channels and wherein at a given time one of the communication channels comprises a reference channel;

a control module operable to communicate with at least some of the plurality of buffers and with a synchronous communication like, the communication link operable to communicate the information from each of the plurality of asynchronous signals associated with the plurality of communication channels at a frame rate, the control module operable to determine a current depth of the buffer associated with the reference channel and to adjust the frame rate of the synchronous communication like based at least in part on the current depth of the buffer associated with the reference channel, wherein the synchronous communication like carries at least the information associated with the reference channel and the information associated with another one of the plurality of communication channels.

18. The system of claim 17, wherein each of the plurality of buffers comprises a logical partition within a single memory structure.

19. The system of claim 17, wherein each of the plurality of buffers comprises a separate memory structure.

20. The system of claim 17, wherein the asynchronous signal comprises at least one sample of an analog voice signal.

21. The system of claim 17, wherein the asynchronous signal comprises an asynchronous transfer mode (ATM) signal or a Frame Relay signal.

22. The system of claim 17, wherein the synchronous communication link comprises a time division multiplexing bus.

23. The system of claim 17, comprising an asynchronous communication link coupled between the plurality of buffers and the synchronous communication link.

24. The system of claim 17, wherein the memory comprises:

a reference channel storage operable to store an identification of a current reference channel; and wherein the control module is operable to, for each asynchronous signal received, determine whether a valid reference channel exists, if no valid reference channel exists, determine whether the communication channel associated with the current asynchronous signal is suspended, and if the current channel is not suspended, to designate the current channel as the reference channel.

25. The system of claim 17, wherein the memory comprises:

a target depth storage operable to store a value corresponding to a desired buffer depth;

a buffer history operable to store one or more values identifying the depth of the buffer associated with the reference channel; and wherein the control module is operable to:

compare the current depth of the reference buffer to a target depth;

increase the frame rate of the synchronous communication link if the current depth is greater than the reference depth; and decrease the frame rate of the synchronous communication link if the current depth is less than the reference depth.

26. The system of claim 25, wherein the buffer history comprises the current depth and a plurality of previously measured reference buffer depths and wherein the control module is operable to calculate an average depth of the reference buffer over the current depth and the plurality of previously measured depths, and to compare the average depth to the reference depth.

27. The system of claim 17, wherein the memory comprises:

a channel status storage operable to store an identification of the reference channel and a status of each of the plurality of channels associated with each of the plurality of asynchronous signals;

and wherein the control module is operable to change the designation of the reference channel in response to identifying an invalid feedback condition.

28. The system of claim 27, wherein the invalid feedback condition comprises a reduction or loss of the asynchronous signal.

29. The system of claim 28, wherein the reduction or loss of the asynchronous signal comprises a condition selected from the group consisting of a closing of a voice port, loss of signal due to far-end silence suppression, and detection of missing data in the asynchronous signal.

30. The system of claim 27, wherein the invalid feedback condition comprises an encoding change between a current asynchronous signal and a previously received asynchronous signal associated with the same communication channel as the current asynchronous signal.

31. The system of claim 17, wherein the control module comprises a voltage controlled oscillator operable to provide a driving signal to the synchronous communication link, the control module operable to control the input voltage to the voltage controlled oscillator based at least in part on a difference between the current buffer depth and a target buffer depth.

32. The system of claim 17, wherein the control module comprises a voltage controlled oscillator operable to provide a driving signal to the synchronous communication link, the control module operable to control the frame size of the output signal from the oscillator based at least in part on a difference between the current buffer depth and a target buffer depth.

33. A modem operable to emulate a network clock signal for use in communicating asynchronous signals received from an asynchronous communication link to a plurality of interface devices: the modem comprising:

a memory comprising a plurality of buffers each buffer operable to receive one of a plurality of asynchronous signals, wherein at least some of the plurality of asynchronous signals are associated with different ones of a plurality of communication channels;

an interface to a synchronous communication link operable to participate in communication between the memory and a plurality of interface devices, the synchronous communication link driven by one emulated timing signal having a frame rate comprising a plurality of timeslots each timeslots operable to communicate information associated with different ones of the plurality of communication channels;

a control module operable to receive the information from the plurality of asynchronous signals, to identify the communication channel associated with each asynchronous signal, and to store the information of the asynchronous signal in the buffer associated with that communication channel, the control module further operable to identify a reference communication channel, and to selectively modify the frame rate of the emulated timing signal based at least in part on the depth of the buffer associated with the reference channel.

34. The modem of claim 33, wherein each of the plurality of buffers comprises a logical partition within a single memory structure.

35. The modem of claim 33, wherein each of the plurality of buffers comprises a separate memory structure.

36. The modem of claim 33, wherein the synchronous communication link comprises a time division multiplexing bus.

37. The modem of claim 33, comprising an asynchronous communication link coupled between the plurality of buffers and the interface to the synchronous communication link.

38. The modem of claim 33, wherein the memory comprises:

a target depth storage operable to store a value corresponding to a desired buffer depth;

a buffer history operable to store one or more values identifying the depth of the buffer associated with the reference channel; and wherein the control module is operable to:

compare the current depth of the reference buffer to a target depth;

increase the fame rate of the synchronous communication link if the current depth is greater than the reference depth; and decrease the frame rate of the synchronous communication link if the current depth is less than the reference depth.

39. The modem of claim 38, wherein the buffer history comprises the current depth and a plurality of previously measured reference buffer depths and wherein the control module is operable to calculate an average depth of the reference buffer over the current depth and the plurality of previously measured depths, and to compare the average depth to the reference depth.

40. The modem of claim 33, wherein the memory comprises:

a channel status storage operable to store an identification of the reference channel and a status of each of the plurality of channels associated with each of the plurality of asynchronous signals;

and wherein the control module is operable to change the designation of the reference channel in response to identifying an invalid feedback condition.

41. The modem of claim 40, wherein the invalid feedback condition comprises a reduction or loss of the asynchronous signal.

42. The modem of claim 41, wherein the reduction or loss of the asynchronous signal comprises a condition selected from the group consisting of a closing of a voice port, loss of signal due to far-end silence suppression, and detection of missing data in the asynchronous signal.

43. The modem of claim 40, wherein the invalid feedback condition comprises an encoding change between a current asynchronous signal and a previously received asynchronous signal associated with the same communication channel as the current asynchronous signal.

44. The modem of claim 33, wherein the control module comprises a voltage controlled oscillator operable to provide a driving signal to the synchronous communication link, the control module operable to control the input voltage to the voltage controlled oscillator based at least in part on a difference between the current buffer depth and a target buffer depth.

45. The modem of claim 33, wherein the control module comprises a voltage controlled oscillator operable to provide a driving signal to the synchronous communication link, the control module operable to control the frame size of the output signal from the oscillator based at least in part on a difference between the current buffer depth and a target buffer depth.

* * * * *